United States Patent
Weishaupt et al.

(10) Patent No.: US 11,294,737 B2
(45) Date of Patent: Apr. 5, 2022

(54) SELF-MANAGED LOCK ACCESS

(71) Applicant: International Business Machines Corporation, Armonk, NY (US)

(72) Inventors: Simon Weishaupt, Stuttgart (DE); Bernd Nerz, Boeblingen (DE); Wolfgang Fischer, Hildrizhausen (DE)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 16/449,629

(22) Filed: Jun. 24, 2019

(65) Prior Publication Data

US 2020/0401463 A1 Dec. 24, 2020

(51) Int. Cl.
*G06F 9/52* (2006.01)
*G06F 9/46* (2006.01)

(52) U.S. Cl.
CPC .............. *G06F 9/526* (2013.01); *G06F 9/468* (2013.01)

(58) Field of Classification Search
CPC .................................. G06F 9/526; G06F 9/468
See application file for complete search history.

(56) References Cited

U.S. PATENT DOCUMENTS

| | | | | |
|---|---|---|---|---|
| 4,435,766 A | * | 3/1984 | Haber | G06F 9/52 710/200 |
| 5,790,851 A | * | 8/1998 | Frank | G06F 9/52 718/100 |
| 5,933,824 A | * | 8/1999 | DeKoning | G06F 9/52 710/200 |
| 6,237,019 B1 | * | 5/2001 | Ault | G06F 9/52 718/107 |
| 10,169,107 B2 | | 1/2019 | Greco | |
| 2002/0120819 A1 | * | 8/2002 | Hickson | G06F 9/5016 711/163 |
| 2002/0138544 A1 | * | 9/2002 | Long | G06F 9/52 718/107 |
| 2004/0216112 A1 | * | 10/2004 | Accapadi | G06F 9/4881 718/103 |
| 2009/0328041 A1 | * | 12/2009 | Sudzilouski | G06F 9/526 718/100 |

(Continued)

OTHER PUBLICATIONS

Barghi, Saman, "Improving the Performance of User-level Runtime Systems for Concurrent Applications", A thesis presented to University of Waterloo, Waterloo, Ontario, Canada, 2018, 176 pages, © Saman Barghi 2018.

(Continued)

*Primary Examiner* — Benjamin C Wu
(74) *Attorney, Agent, or Firm* — Alexander G Jochym

(57) ABSTRACT

An approach for providing exclusive access to a resource shared by a plurality of processes in a computer system. The approach includes a computer processor retrieving a process identifier for a first process attempting to access the resource, where the process identifier is uniquely assigned to each process of the plurality of processes requiring the resource with the computer system. The approach includes the computer processor using the process identifier for the first process and a mutual exclusion object that includes a lock position allowing exclusive access to the resource and a wait position for a next process to attain the lock position to provide exclusive access to the resource.

17 Claims, 7 Drawing Sheets

(56) References Cited

U.S. PATENT DOCUMENTS

| | | | | |
|---|---|---|---|---|
| 2011/0126174 A1* | 5/2011 | Krauss | ............... | G06F 9/4881 |
| | | | | 717/130 |
| 2011/0126202 A1* | 5/2011 | Krauss | ............... | G06F 9/48 |
| | | | | 718/102 |
| 2015/0301871 A1* | 10/2015 | Duvuru | ............... | G06F 9/52 |
| | | | | 718/104 |
| 2018/0293114 A1 | 10/2018 | Mukherjee | | |

OTHER PUBLICATIONS

Dice et al., "TWA—Ticket Locks Augmented with a Waiting Array", Nov. 9, 2018, 9 pages, arXiv: 1810.01573v2 [cs,IS] Nov. 7, 2018.

* cited by examiner

PROCESS IDENTIFIER EXAMPLE

|  | SMMutex 730 | | | | PROCESS IDENTIFIERS OF PROCESSES MONITORING SMMutex 750 | |
|---|---|---|---|---|---|---|
|  | LOCK POSITION 715 | | WAIT POSITION 725 | | | |
|  | VALID BIT 716A | SEQUENCE ID 716B | VALID BIT 725A | SEQUENCE ID 725B | VALID BIT 751A | SEQUENCE ID 751B |
| 1 | 1 | 3 | 1 | 27 | 0 | 0 |
| 2 | 1 | 3 | 1 | 27 | 1 | 9 |
| 3 | 1 | 3 | 1 | 9 | 1 | 27 |
| 4 | 1 | 9 | 0 | 0 | 1 | 27 |
| 5 | 1 | 9 | 1 | 27 | 0 | 0 |
| 6 | 1 | 27 | 0 | 0 | 0 | 0 |
| 7 | 0 | 0 | 0 | 0 | 0 | 0 |

FIG. 7

SELF-MANAGED LOCK ACCESS

BACKGROUND

The present invention relates generally to the field of computer data processing, and more particularly for limiting access to a computing resource required by multiple computing processes for execution.

Concurrency is an essential part of many large-scale software systems. In computer engineering, it is common for multiple processes or threads to access a single resource, where the process or thread needs exclusive control of the resource for execution. Many concurrent algorithms utilize various types of access control mechanisms to ensure synchronization that provides individual access to shared resources. In some cases, the shared resources are critical sections of a program that are encapsulated to allow only one process or thread to execute at a given time.

One commonly applied solution to maintaining exclusive access of a process or a thread to a shared resource is a mutual exclusion object that can lock the shared resource once a process or thread gains access to the shared resource, thereby, preventing access to the shared resource by any other process. Mutual exclusion locks are commonly designed to enforce a mutual exclusion control policy. The mutual exclusion control policy can require each process or thread to acquire a lock before accessing an individual shared resource in order to execute section of code or algorithms of the individual shared resource. Once the process or thread acquiring the single shared resource has completed execution of the code of the single shared resource, the process must release the single shared resource from its locked status before continuing with further processing. In this situation, any other process or thread requiring acquisition of the single shared resource that is locked by another process must wait until the single shared resource is released or unlocked by the process or thread currently utilizing the single shared resource.

SUMMARY

Embodiments of the present invention provide a method, a computer program product, and a computer system for providing exclusive access to a resource shared by a plurality of processes. The method includes a computer processor retrieving a process identifier for a first process attempting to access the resource, where the process identifier is uniquely assigned to each process of the plurality of processes requiring access to the resource. The method includes the computer processor providing exclusive access to the resource using, at least, the process identifier for the first process and a mutual exclusion object where the mutual exclusion object includes a lock position allowing exclusive access to the resource and a wait position for a next process to attain the lock position.

BRIEF DESCRIPTION OF THE DRAWINGS

FIG. 7 is an example of the lock management program providing exclusive access to a plurality of processes requiring access to a SMMutex controlling a lock for a resource, in accordance with at least one embodiment of the invention.

DETAILED DESCRIPTION

Figure 1:
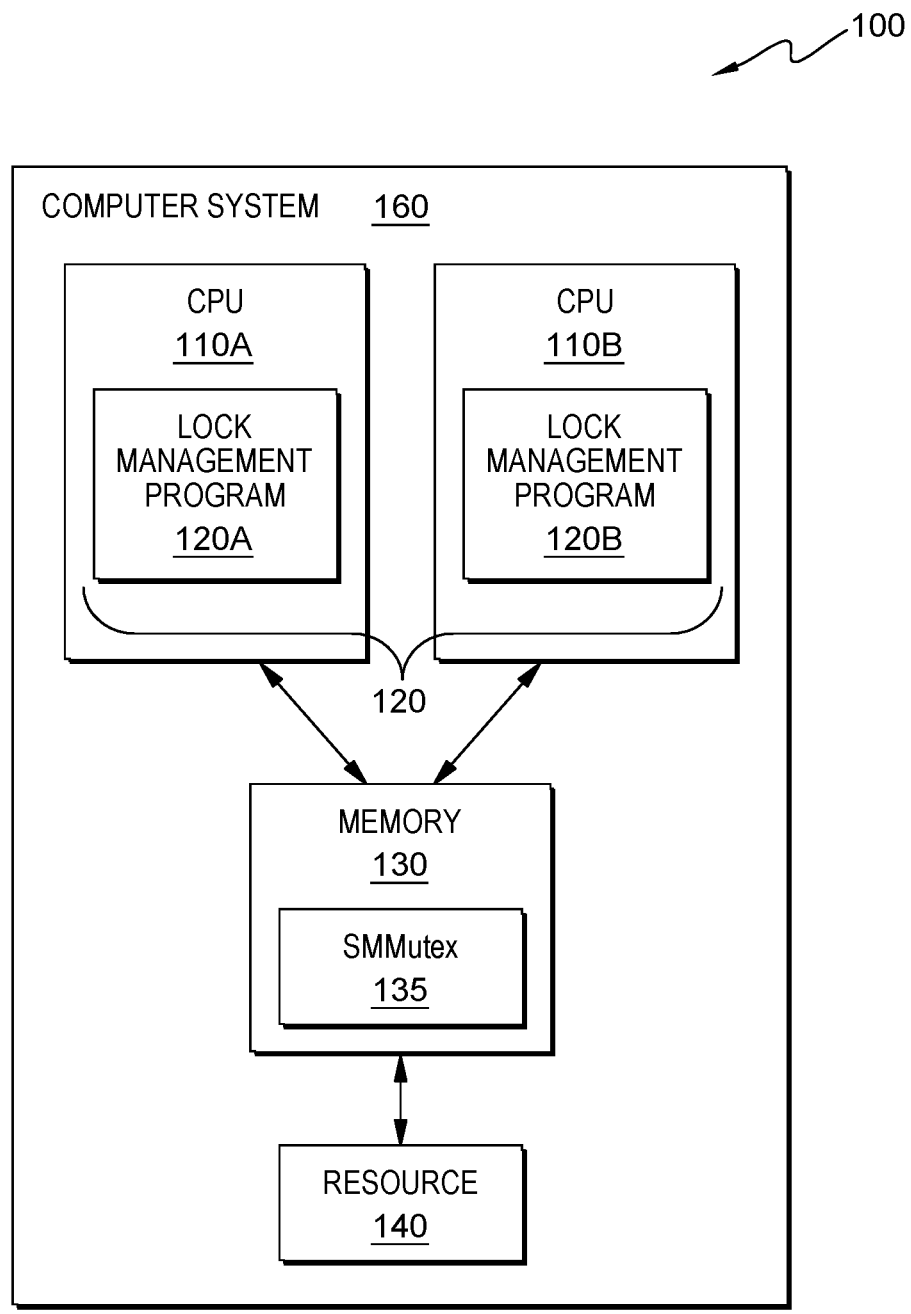
FIG. 1 is a functional block diagram of a computing environment suitable for operation of a lock management program, in accordance with at least one embodiment of the invention.

Embodiments of the present invention recognize that when mutual exclusion is required by multiple processes or threads requiring exclusive access to a single shared resource in a computing environment, a mutual exclusion object is commonly used to lock the shared resource when a process or thread obtains access to the shared resource. Embodiments of the present invention recognize that when multiple processes or threads require access to the single shared resource, creating contention for the single shared resource, the mutual exclusion object lock can be applied. Embodiments of the present invention recognize that various methods of providing and monitoring access to the single shared resource exist, each method with different effects and performance tradeoffs and that some of the methods can be classified as "unfair" by providing access to a process with a fastest access time. Embodiments of the present invention recognize that some of the methods providing and monitoring access to the single shared resource can be classified as "fair" where commonly used fair methods include first in, first out or a round robin method of controlling access to the single shared resource.

Embodiments of the present invention recognize that currently available concurrent queue algorithms, such as available mutual exclusion objects (e.g., Mutex), do not provide a fair queue management when multiple processes or threads require access to a shared resource without adding additional functionality such as a scheduler. Embodiments of the present invention recognize that while a Mutex prevents access by another process to an obtained shared resource, a sequence of access to the shared resource is unpredictable. Embodiments of the present invention recognize that currently available Mutex can provide unfair access order of processes to the shared resource. Embodiments of the present invention recognize that several types of schedulers exist that provide fair access to the shared resource by employing round robin or first in, first out methodologies. Embodiments of the present invention recognize that these schedulers typically require additional code, where the additional code resides in a location, such as in a program on a server a processor, or in any other additional logic managing the single shared resource to add a fair queue scheduling functionality to the shared resource. Embodiments of the present invention recognize that a method of providing a fair and exclusive access to a shared resource without additional code, such as a scheduler, is desirable.

Embodiments of the present invention provide a self-managed lock access method in a computing system when multiple processes or threads require exclusive access to a single, shared resource using a lock management program. Embodiments of the present invention provide a lock management program coupled with a self-managed Mutex, where the self-managed Mutex includes both a lock and a wait position when multiple processes or threads require access to a shared resource. The self-managed Mutex will be referred to as a SMMutex hereinafter, where the SMMutex includes not just a lock position but, includes a wait position of a next process or a next thread to receive access to the lock in the SMMutex.

Embodiments of the present invention provide a decentralized self-managed lock access method where each process or thread requesting access within a computer system are assigned a unique identification that is used by the lock management program to manage fair and exclusive access to the shared resource. Embodiments of the present invention provide a method, a computing system and computer product programming code of a lock management program providing fair access to a shared resource by utilizing a SMMutex, located in memory or storage. Embodiments of the present invention uses the lock management program resident in each of a plurality of processes or threads desiring access to the shared resource, where the lock management program in each process can read, monitor, and change the SMMutex in order to provide fair and equitable access to the shared resource.

Embodiments of the present invention use an algorithm in the lock management program in conjunction with a unique process identifier assigned for each process or thread in the computer system to determine a fair access order or sequence of access for the various processes requesting access to the shared resource. Embodiments of the present invention use the algorithm in the lock management program to determine when a process identifier in the wait position of the SMMutex should be replaced with a process identifier of another process requiring access to the shared resource in order to maintain a fair access order for the processes requiring access to the shared resource. Embodiments of the present invention provide lock management program with an ability to release a lock in a SMMutex and simultaneously fill the lock atomically with a process identifier of the process or thread that was in the wait position in SMMutex when a process holding the SMMutex lock has completed execution of the shared resource. Embodiments of the present invention provide each process or thread requiring access to the shared resource with a unique process identifier for a computer system within which the processes reside and a copy or instance of the lock management program in order to monitor a SMMutex controlling a lock for the shared resource. Furthermore, embodiments of the present invention using the lock management program and SMMutex with the unique process identifiers of each process requiring access to the shared resource provides fair and exclusive access to the shared resource without the additional need of a central instance, such as a scheduler. Additionally, embodiments of the present invention utilize an algorithm within the lock management program to determine a fair access to the shared resource that uses less additional resources when compared to a first in, first out queue.

Embodiments of the present invention provide the lock management program in each process of the plurality of processes requiring access to the shared resource with an ability to read the SMMutex and when appropriate, to change entries in the lock position and the wait position of the SMMutex. Embodiments of the present invention use the lock management program to determine if the lock position or the wait position are empty, in order to enter a process identifier of a process requesting access to the shared resource and to determine, by an algorithm in the lock management program, if a process requesting access to the shared resource can replace another process currently in the wait position of the SMMutex when the lock position and the wait position of the SMMutex are occupied. Embodiments of the present invention recognize each process of a plurality of processes or threads, using the lock management program, monitor the SMMutex and recognize changes to the SMMutex. Additionally, embodiments of the present invention provide an algorithm in the lock management program that allows a process that temporarily leaves the lock management program to re-enter the lock management program at a later time when a group of one or more other processes are awaiting access to the shared resource where the process re-entering the lock management program by re-attempting to access the shared resource can have the same priority for access to the shared resource as the process would have had if the process did not leave the lock management program at all, when the process identifier at the lock position executing the shared resource did not change in the meantime.

Embodiments of the present invention provide a method, a computer program product, and a computer system, using a lock management program, that can be executed at various levels of a computer system environment, such as on a semiconductor chip level, a desktop computer level, a mobile computing device level, a mainframe computer level, or in a cloud level computing environment where each of these levels of a computer system environment can be considered as a single computer system utilizing the lock management program on a plurality of processes requiring access to the shared resource. Embodiments of the present invention provide a method, a computer program product, and a computer system, using the lock management program to provide fair and exclusive access to a shared resource with a SMMutex.

The present invention will now be described in detail with reference to the Figures.

FIG. 1 is a functional block diagram of a computing environment 100 suitable for operation of lock management program in accordance with at least one embodiment of the invention. FIG. 1 provides only an illustration of one implementation and does not imply any limitations with regard to the environments in which different embodiments may be implemented. Implementation of embodiments of the invention may take a variety of forms, and exemplary implementation details are discussed subsequently with reference to the Figures. Many modifications to the depicted environment may be made by those skilled in the art without departing from the scope of the invention as recited by the claims.

Computing environment 100 includes computing system 160 with memory 130, resource 140, and two central processing units (CPU) 110A and CPU 110B that require access to resource 140, where each of CPU 110A and 110B includes lock management program 120A and lock management program 120B, respectively. Lock management program 120A and lock management 120B have the same programming code and functions and are a copy of the same program residing in different locations. For ease of discussion, lock management program 120A, lock management program 120B, and any other copies of a lock management program not otherwise identified hereinafter will be referred to as lock management program 120. In various embodiments, computing environment 100 is distributed data processing environment including a plurality of computing devices connected over a network (not depicted in FIG. 1). The network can include, for example, wireless local area network (WLAN), a telecommunications network, a local area network (LAN), a virtual LAN (VLAN), a wide area network (WAN), such as the Internet, or a combination of the these, and can include wired or wireless connections. In general, the network can be any combination of connections and protocols that will support communications between computer system 160 and other computing devices (not shown) within computing environment 100. In an embodiment, computing environment 100 is a cloud computing environment.

In various embodiments, computing system 160 is a computing device that can be a semiconductor chip, a laptop computer, tablet computer, netbook computer, personal computer (PC), a desktop computer, a mainframe computer, a personal digital assistant (PDA), a smartphone, smartwatch, or any programmable electronic device capable of receiving, sending, and processing data or, in some embodiments, computing system 160 is composed of more than one computing devices requiring access to a shared resource as may occur in a cloud computing environment or other group of computers in a multi-computer environment that are managed as a single computing system. In general, computing system 160 represents any programmable electronic device or combination of programmable electronic devices capable of executing machine readable program instructions and communicating with other computing devices (not shown) within computing environment 100 via a network.

In various embodiments, computer system 160 is designed as a computer system with multiple processes requiring access to a shared resource, such as resource 140, where each of the processes in computer system 160 requiring access to a single, shared resource are assigned a unique identification, such as a process identifier, used by lock management program 120 and SMMutex 135 to provide fair and exclusive access to the single, shared resource (e.g., resource 140).

In various embodiments, computer system 160 is a semiconductor chip with CPU 110A and CPU 110B, where a chip designer, a system architect, or the like assigns a unique process identifier to CPU 110A and CPU 110B. For example, computer system 160 can be a semiconductor chip with CPU 110A and CPU 110B as two processes requiring access to a hardware accelerator shared by multiple CPUs. While CPU 110A and CPU 110B are central processor units or processors in a semiconductor chip accessing a single resource, such as resource 140 (e.g., a hardware accelerator), in other embodiments, any other semiconductor function or computer process (i.e., not just CPUs) that require access to resource 140, can each be a process in computer system 160 (e.g., a semiconductor chip) that can utilize a copy of lock management program 120 when a unique process identifier is assigned to each process and when SMMutex 135 is implemented.

In another embodiment, computer system 160 is mainframe computer with multiple processor units or other computer processes requiring access to a shared resource. For example, the shared resource, such as resource 140, is a specific operation in a storage device, a routine in a program, a program, a location in memory, a section of a database, an application, or other computer resource that may be a shared resource with an access controlled by a locking device, such as a Mutex or for embodiments of the present invention by SMMutex 135, where each of the multiple processes are computer processes requiring access to resource 140 can be assigned a process identifier by the system architect or other designer responsible for developing computer system 160.

In yet another embodiment, computer system 160 is a cloud computing environment composed of a plurality of interconnected computing devices connected by a network (not depicted in FIG. 1). In this example, a single shared resource can be a specific section of a database in a remote storage device that multiple applications or other computer processes require access to. A copy of or an instance of lock management program 120 resides in each of the multiple applications requiring access to the single shared resource and can provide fair access to the single shared resource, such as the specific section of the database, using SMMutex 135.

Figure 8:
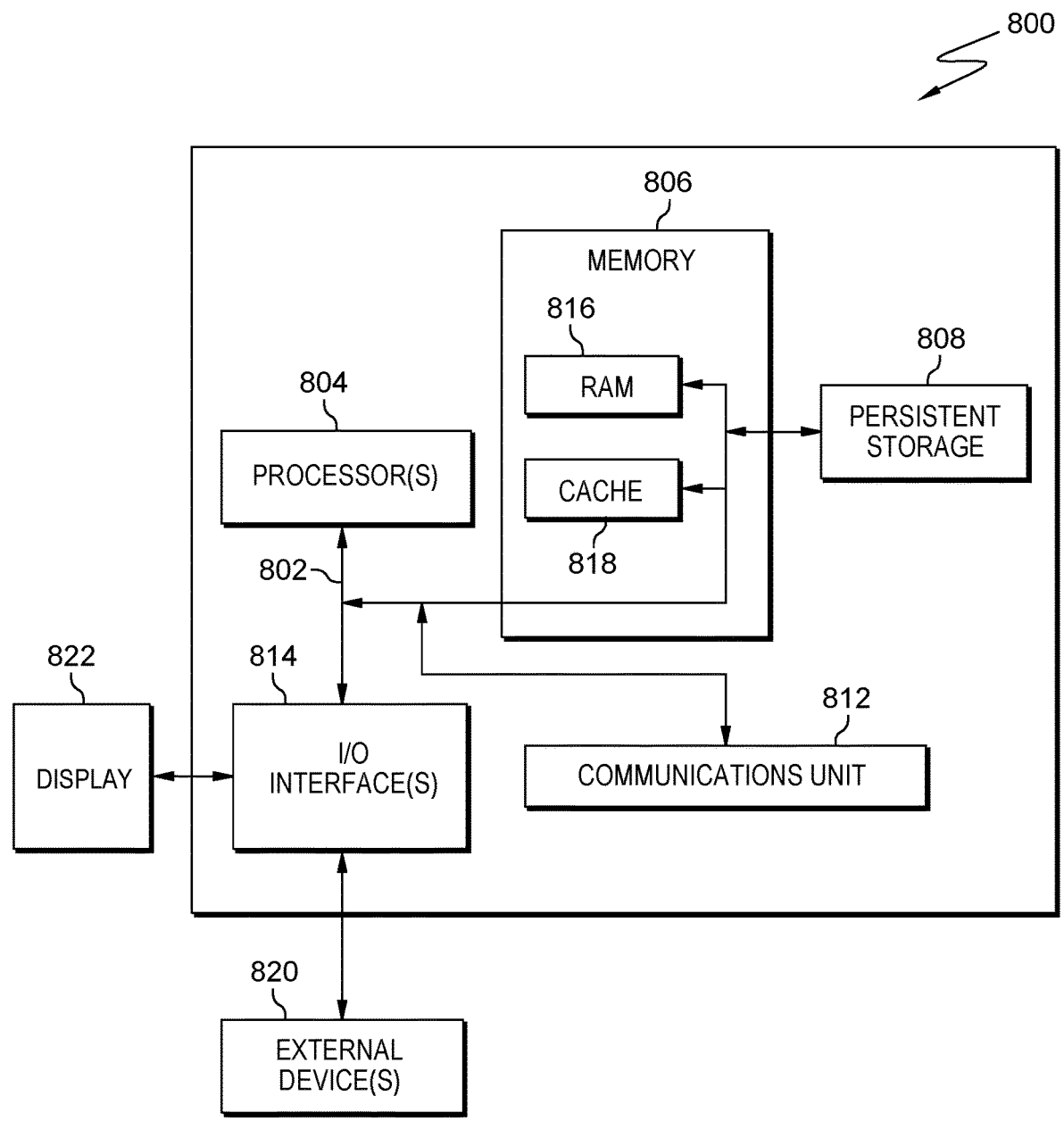
FIG. 8 is a block diagram depicting components of a computer system suitable for executing the lock management program, in accordance with at least one embodiment of the invention.

In some embodiments, computer system 160 is computer system 800 as depicted in FIG. 8. Computer system 160 can be any single computing device with multiple processes requiring access to a shared resource, such as a single function in computer system 160, where each of the multiple processes have been assigned a unique process identification (e.g., process identifier). In other embodiments, computer system 160 is a system composed of groups of connected computing devices where each of the processes in computer system 160 that require access to a single shared resource, such as resource 140, have been assigned unique process identification (e.g., process identifier), and each process requiring access to resource 140 has a copy of lock management program 120. Additionally, each of the processes requiring access to resource 140 with a copy of lock management program 120 are also capable of executing lock management program 120 with SMMutex 135 and using the unique process identifier to provide fair and exclusive access to a shared resource where the shared resource is a computing resource, such as resource 140.

Resource 140 can be any computing resource required by multiple processes, processors, or threads, where resource 140 executes for a single computer process, computer processor, or computer thread. In various embodiments, a process is a computer process. For example, a process includes a function, one or more instructions, a sub-routine, routine, a thread, or application running program code. For ease of discussion, hereinafter, a computing element or computing function such as a process, a processor, a central processing unit (CPU), or a thread requiring access to resource 140 will be referred to as a process. In various embodiments, resource 140 executes in an exclusive manner (i.e., with one process at one time). Resource 140 can be any computing resource, such as an operation, a function, a memory buffer, an application, or the like requiring access by a single process, for example, to prevent an overwrite of code or data. In various embodiments, when computer system 160 is a semiconductor chip with processes CPU 110A and CPU 110B, the shared resource (e.g., resource 140) is a hardware accelerator for cryptographical computations, compression units, special conversions, or a printer. The shared resource is not limited to these examples but may be any computing resource that multiple processes require access to that can use a locking device, such as a mutual exclusion object, with a wait and lock position to control access to the shared resource.

While resource 140 is depicted as a single resource in computer system 160, more than one or a plurality of shared resources, such as a plurality of resource 140, each requiring exclusive access during execution by multiple processes can reside in computer system 160. In one embodiment, resource 140 resides in another location in computer environment 100, such as in another computing device (not shown). For example, another computer device with resource 140 can be another semiconductor chip, another computer, a remote storage device, or the like with a mutual exclusion object with a wait and a lock position (e.g., SMMutex 135). In various embodiments, resource 140 does not need additional programming code, such as a scheduler, to provide a fair and equitable access order for each of the processes requiring access to resource 140 when each of the processes requiring access to resource 140 has a unique process identifier and utilize lock management program 120 in conjunction with SMMutex 135.

SMMutex 135 is a mutual exclusion object or operand that provides both a locking capability using a lock position when a process acquires access to resource 140 and a wait position for a process that is next to acquire access to resource 140 when the process with access or holding the lock to resource 140 completes processing and exits the lock of SMMutex 135 by releasing a lock position of SMMutex 135. In various embodiments, SMMutex 135 provides a lock and a wait position. In these embodiments, lock management program 120, residing on each process requiring access to resource 140, is capable moving process identifiers of the various processes requiring access to resource 140 into or out the lock position and the wait position of SMMutex 135. In SMMutex 135, each of the lock position and the wait position may be empty or loaded with a process identifier by lock management program 120. For example, when lock management program 120 moves a process identifier of a process into the lock position of SMMutex 135, the process has gained access to the lock in SMMutex 135. With access to the lock in SMMutex 135, the process can exclusively execute resource 140. When the process in the lock position of SMMutex 135 completes processing, if the wait position of SMMutex 135 is occupied, then lock management program 120 residing on the process exits resource 140 and atomically or nearly simultaneously moves a process identifier of a process in the wait position into the lock position of SMMutex 135.

In various embodiments, lock management program 120 monitors SMMutex 135. For example, when both the lock position and the wait position of SMMutex 135 are loaded, a new process requiring access can monitor SMMutex 135. In some cases, lock management program 120 can determine a new process requiring access to resource 140 has a higher priority than a process currently occupying the wait position in SMMutex 135 and in this case, lock management program 120 removes the process in the wait position and replaces the process with the new process with a the higher priority (i.e., removes the process identifier in the wait position and puts the process identifier of the process with the higher priority in the wait position of SMMutex 135). As depicted in FIG. 1, SMMutex 135 is included in memory 130. In some embodiments, SMMutex 135 resides in storage, such as persistent storage 808 in FIG. 8, in a database, or in another computing or storage device, not shown in FIG. 1.

In one embodiment, SMMutex 135 includes an algorithm that determines whether a process requiring access to resource 140 accesses the wait position when the lock position and wait positions are occupied. For example, an algorithm, such as algorithm 570 in FIG. 5B discussed in detail later, resides in SMMutex 135. In this example, a new process requiring access to resource 140 queries SMMutex 135 for access to resource 140, and if the lock position and the wait position in SMMutex 135 are occupied, or when two or more processes request access to resource 140 at the same time to acquire an unoccupied wait position, then SMMutex 135 determines if a new process requesting access to resource 140 has a higher or a highest priority to gain access to the wait position using algorithm 570, as described in detail later with respect to FIG. 5B. In this embodiment, algorithm 570 resides in SMMutex 135 and not in lock management program 120. When the conditions of algorithm 570 are met, then SMMutex 135 replaces the process currently in the wait position with the new process that meets the conditions of algorithm 570 in the wait position of SMMutex 135.

A copy of lock management program 120 is included in each process in computer system 160 requiring access to resource 140. In various embodiments, lock management program 120 monitors and controls access to SMMutex 135 to provide a fair and equitable method of managing access to resource 140 by using an algorithm, such as algorithm 570 in FIG. 5B discussed in detail later, to determine which of a plurality of processes requiring access to resource 140 should be the next process to acquire resource 140. In various embodiments, lock management program 120 moves a process into or out of the lock position of SMMutex 135 and moves a process into or out of the wait position of SMMutex 135. For example, lock management program 120 can move a process into or out of the lock or the wait position by moving the process identifier associated with a process into or out of the wait or lock position. In various embodiments, lock management program 120 determines which process is the next process to access resource 140 by determining which process acquires the wait position in SMMutex 135 when the lock position of SMMutex 135 is occupied and more than one other process is requesting access to resource 140.

In various embodiments, lock management program 120 includes an algorithm that determines whether a process in the wait position in SMMutex 135 should be replaced by another process desiring to acquire access to resource 140. When the conditions of the algorithm are met, as discussed later in detail with respect to FIG. 5B, lock management program 120 replaces the process identifier of the process currently occupying the wait position with the process identifier of a new process that meets the conditions of the algorithm.

Lock management program 120A and 120B are each a copy or instance of lock management program 120 residing on each of CPU 110A and CPU 110B, respectively, where CPU 110A and CPU 110B are two process in computer system 160 requesting access to resource 140. Lock management program 120, present in each process in computer system 160 requiring access to resource 140, utilizes unique process identifiers for each process and an algorithm in conjunction with SMMutex 135, to provide fair and exclusive access to resource 140. In one embodiment, lock management program 120 does not include the algorithm (e.g., algorithm 570 in FIG. 5B) used to determine a fair access to a wait position in SMMutex 135. In this embodiment, SMMutex 135 includes the algorithm used to determine access to a wait position.

In various embodiments, lock management program 120 provides an ability of a process requesting access to resource 140 to leave lock management program 120 temporarily (e.g., temporarily stop attempting to access resource 140). Upon returning to lock management program 120 (e.g., return to re-attempt to access resource 140), the process will have a same priority for access to the shared resource when no new processes are requesting access to the shared resource. For example, if process X is in the wait position temporarily leaves lock management program 120, the process identifier of process X temporarily leaving is removed from the wait position (e.g., process X leaves the wait position temporarily to execute another function). When the lock position of SMMutex is still occupied by the same process identifier as the process that occupied the lock position when process X left (e.g., same process is in the lock position and is still executing resource 140), upon returning and re-attempting to access resource 140, lock management program 120 returns the process identifier of process X to the wait position if the process still meets the conditions of an algorithm, such as algorithm 570 discussed later in detail with respect to FIG. 5.

In some embodiments, when a first process leaves the wait position, a second process using another copy of lock management program 120 attains the wait position sometime after the first process left and upon return, if the first process does not meet the conditions of the algorithm in lock management program 120, then the first process does not recover the wait position from the second process. In this case, lock management program 120 on the first process determines that the second process has a higher priority than the first process and therefore, lock management program 120 on the first process cannot remove the second process from the wait position of SMMutex 135. In this example, the second process with a higher priority retains the wait position upon the first process return.

In various embodiments, lock management program 120 allows a process to exit a buffer of processes waiting for resource 140 (e.g., to temporally stop monitoring SMMutex 135) in order to execute another code routine or function and be provided a fair or a same access to resource 140 as if the process did not leave or stop monitoring SMMutex 135. In other words, if a first process had a higher priority than a second process as determined by the algorithm in lock management program 120 when the first process left a wait position in SMMutex 135, the first process would regain the wait position from the second process upon the first process return (assuming the lock position remained occupied).

Similarly, if the first process in the wait position leaves and a third process requests access to resource 140 after the first process left where the third process has a higher priority as determined by the algorithm in lock management program 120, upon return the first process will not regain the wait position. While these examples use a wait position, the concept illustrated works for all processes monitoring SMMutex 135 (e.g., not just the process in a wait position). Lock management program 120 allows a process to leave lock management program 120 when one or more of other processes are waiting for access to the wait position in SMMutex 135 and have a same priority upon return as the exiting process would have had if it stayed monitoring or waiting for access to the wait position in SMMutex 135, if the lock position of SMMutex 135 is still occupied by the same process identifier. With lock management program 120, the priority of each process is fairly determined based on an algorithm, such as algorithm 570 in FIG. 5B, discussed in detail later, that is in lock management program 120.

Figure 2:
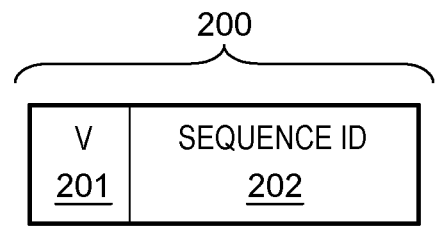
FIG. 2 is an example of a process identifier for use with the lock management program, in accordance with at least one embodiment of the invention.

FIG. 2 is an example of process identifier 200 for use with the lock management program 120, in accordance with at least one embodiment of the invention. Process identifier 200 is a unique identifier that is assigned to each process in computer system 160 requiring access to resource 140. For example, each of a plurality of process identifier 200 may be assigned by a semiconductor chip designer, by a system architect, by an automated design system, or by another appropriate method or designer is unique within computer system 160. In one example, process identifier 200 can be a hexadecimal number, however, process identifier 200 can use any numbering system capable of using algorithm 570 depicted in FIG. 5B. Process identifier 200 can be stored in one or more of memory 130, in persistent storage or random access memory (RAM), such as persistent storage 808 or RAM 816 in FIG. 8, as metadata associated to the process, metadata within the process, or in another storage location within computer system 160.

In various embodiments, process identifier 200 for each process requiring access to resource 140 consists of two parts, valid indicator depicted as V 201 and sequence identifier (ID) depicted as sequence ID 202, which is a unique identifier within computer system 160. A valid indicator can be as simple as one bit. In various embodiments, if the valid indicator is zero (i.e., V 201=0), then the process identifier is defined as not a valid entry or in other words, if V 201 is zero, then a position is empty and sequence ID 202 is not a valid entry. In other cases, if the valid bit is a one (i.e., V 201=1), then sequence ID 202 is considered a valid entry. In an embodiment, a process identifier is a single number or entity composed of a sequence identifier (e.g., without valid identifier V 201). Sequence ID 202 may be any suitable numbering methodology or identifier that can be utilized with an algorithm in lock management program 120 to determine a fair and equitable priority for a wait position of a process, such as CPU 110A, in SMMutex 135.

Figure 3:
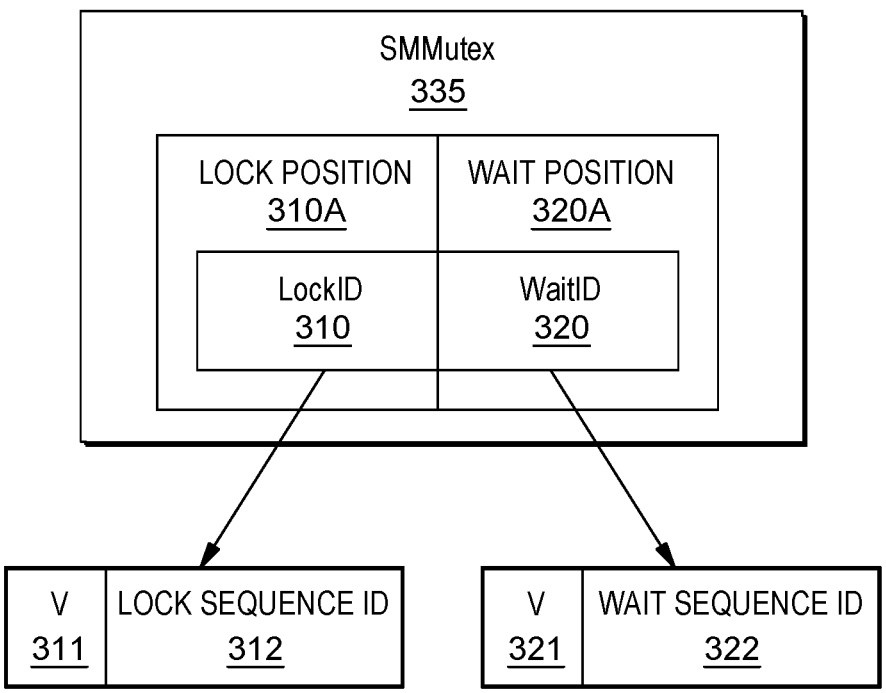
FIG. 3 is an example of a SMMutex for use with the lock management program, in accordance with at least one embodiment of the invention.

FIG. 3 is an example of SMMutex 335 for use with lock management program 120, in accordance with at least one embodiment of the invention. As depicted in FIG. 3, SMMutex 335 includes lock position 310A holding LockID 310 and wait position 320A holding WaitID 320, where LockID 310 is a process identifier of the process in lock position 310A holding the lock in SMMutex 135 for resource 140 and WaitID 320 is a process identifier for a process that is the process that will next access lock position 310A. In various embodiments, as the process occupying lock position 310A or wait position 320A changes, the process identifier (e.g., the sequence ID number) in lock position 310A and/or wait position 320A changes. Some examples of processes changing in lock position 310A and in wait position 320A are depicted in detail later in FIG. 7.

As depicted in FIG. 3, LockID 310 is a process identifier consisting of valid indicator V 311 and LockSequenceID 312. WaitID 320 is a process identifier in wait position 320A consisting of valid indicator V 321 and WaitSequence ID 322. In other examples, SMMutex 335 can be empty, (e.g., when no processor identifiers populate lock position 310A and wait position 320A), or SMMutex 335 may only be locked (e.g., when only lock position 310A is populated). In various embodiments, WaitID 320 and LockID 310 are process identifiers of a process currently holding wait position 320A and lock position 310A, respectively.

Figure 4A:
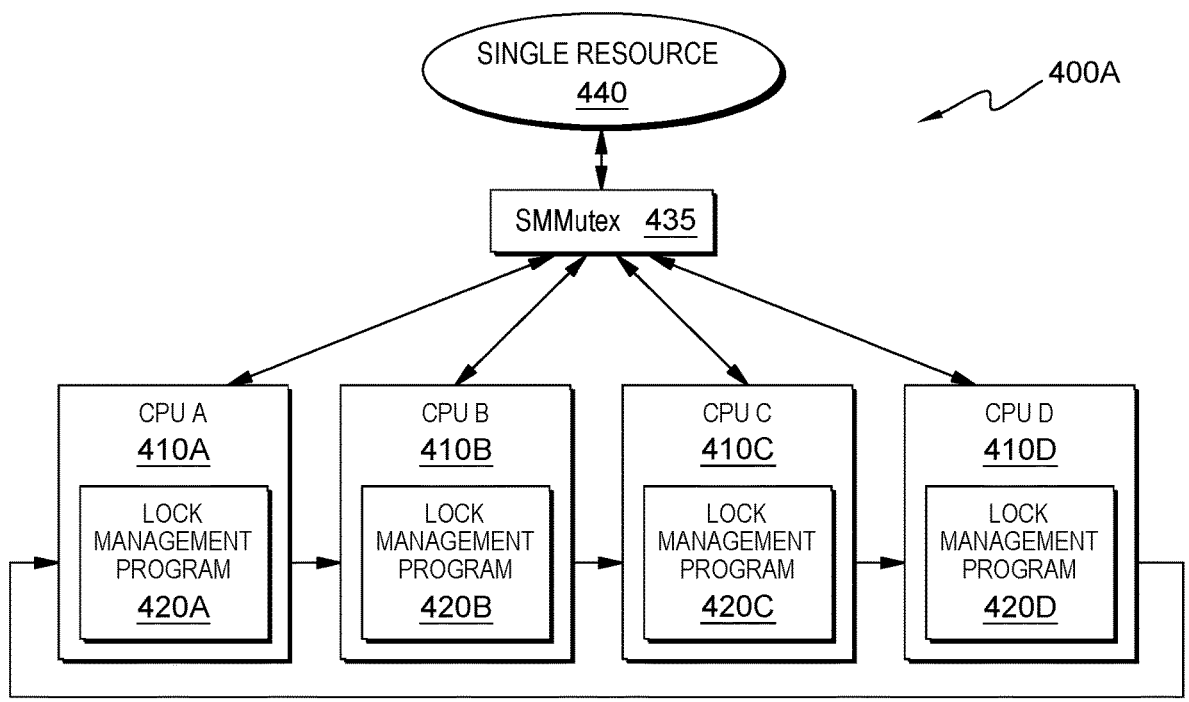
FIG. 4A is an example of the lock management program executing on multiple central processing units requiring accessing a single resource in a computing environment, in accordance with at least one embodiment of the invention.

FIG. 4A is an example of lock management program 420A-D in computing environment 400A, executing on multiple processes (e.g., CPU 410A-CPU 410D) requiring accessing single resource 440, in accordance with at least one embodiment of the invention. As depicted, FIG. 4A includes CPU 410A, CPU 410B, CPU 410C, and CPU 410D requiring access to resource 440 that are monitoring SMMutex 435, where each of CPU 410A-410D have a copy of lock management program 120, depicted as lock management program 420A-D, respectively. In various embodiments, lock management program 420A-D are each a copy of the program (e.g., 420A, 420B, 420C, and 420D) and each contain essentially the same programming codes and routines as lock management program 120 in FIG. 1 (e.g., each of lock management program 420A-420D and lock management program 120 are the same program in different locations and each copy of the program performs the same functions as described with respect to lock management program 120). SMMutex 435 provides a similar function as SMMutex 135 in FIG. 1. Lock management program 420A-D each use an algorithm utilizing the process identifiers for each of CPU 410A-410D and SMMutex 435 to provide access to single resource 440, where a fair access order of the processes of CPUs 410A-410D sequences from CPU 410A to CPU 410B to CPU 410C to CPU 410D, in accordance with each copy of lock management program 420A-D.

Figure 4B:
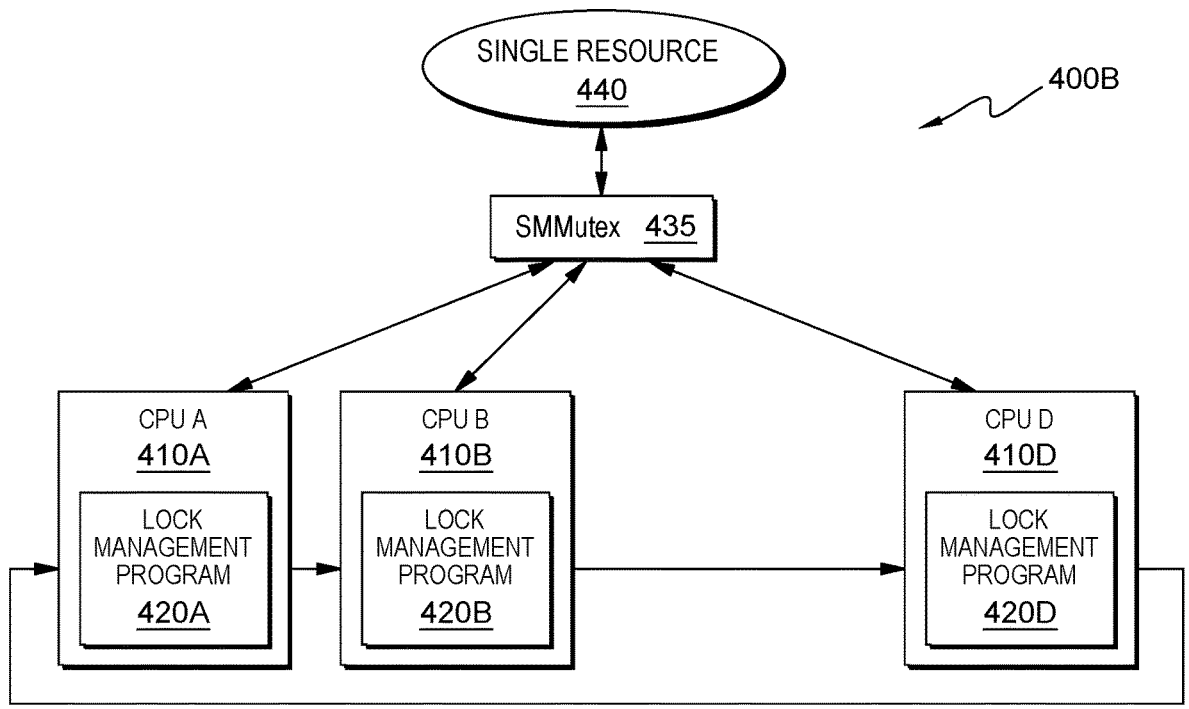
FIG. 4B is an example of the lock management program executing on multiple central processing units requiring accessing a single resource in a computing environment at a later time, in accordance with at least one embodiment of the invention.

FIG. 4B is an example of lock management program 420A, 420B, and 420D in computing environment 400B, executing on multiple processes (e.g., CPU 410A, CPU 410B and CPU 410D) requiring accessing single resource 440 at a later time, in accordance with at least one embodiment of the invention. As depicted, FIG. 4B includes CPU 410A, CPU 410B, and CPU 410D accessing and monitoring SMMutex 435 at a later period of time than depicted in FIG. 4A, where a fair access order of the processes or CPUs 410A, CPU 410B, and CPU 410D sequences from CPU 410A to CPU 410B to CPU 410D, in accordance with lock management program 420A, 420B and 420D respectively using algorithm 570, the process identifiers for each of CPU 410A, CPU 410B, and CPU 410D, and SMMutex 435 when CPU 410C temporarily leaves lock management program 420C (e.g., leaves to execute another function or application). In this example, using lock management program 420C, upon the return of CPU 410C at a later time when CPU 410C again requires or requests access to resource 140 and when a same process is still executing resource 440 (i.e., the process identifier in the lock position of SMMutex 435 is the same as when CPU 420C left) the sequence of processes reverts back to the order as depicted in FIG. 4A where the order sequences from CPU 410A to CPU 410B to CPU 410C to CPU 410D.

Figure 5A:
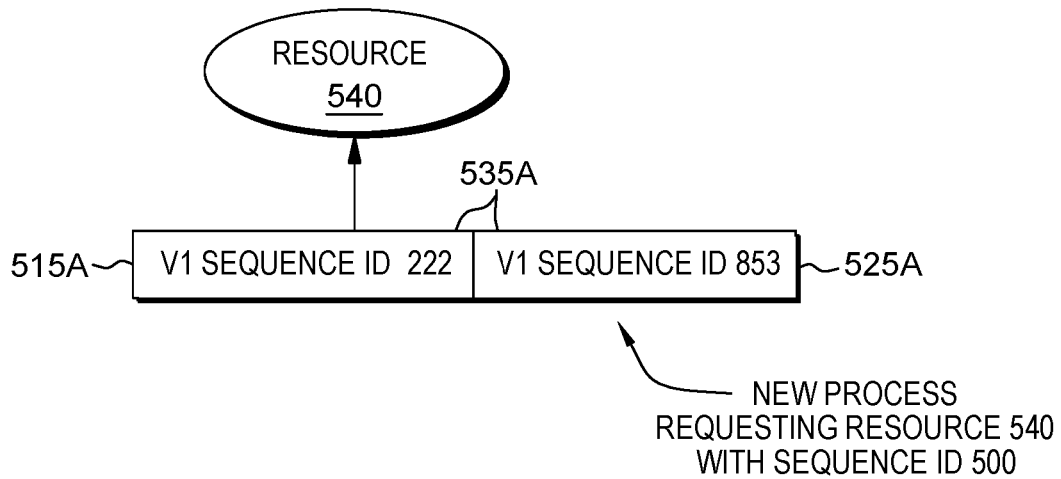
FIG. 5A is an example of multiple processes using the SMMutex with the lock management program, in accordance with at least one embodiment of the invention.

FIG. 5A is an example of multiple processes with lock management program 120 (not depicted) using SMMutex 535A, in accordance with at least one embodiment of the invention. As depicted, FIG. 5A includes SMMutex 535A which includes lock position 515A loaded with a process identifier of a first process composed of a valid indicator (e.g., V1) and sequence ID 222 that is executing resource 540, wait position 525A loaded with a process identifier of a second process with a valid indicator (e.g., V1) and sequence ID 853. Additionally, FIG. 5A includes a new process or third process with sequence ID 500 that is coming to SMMutex 535A to request resource 540.

Figure 5B:
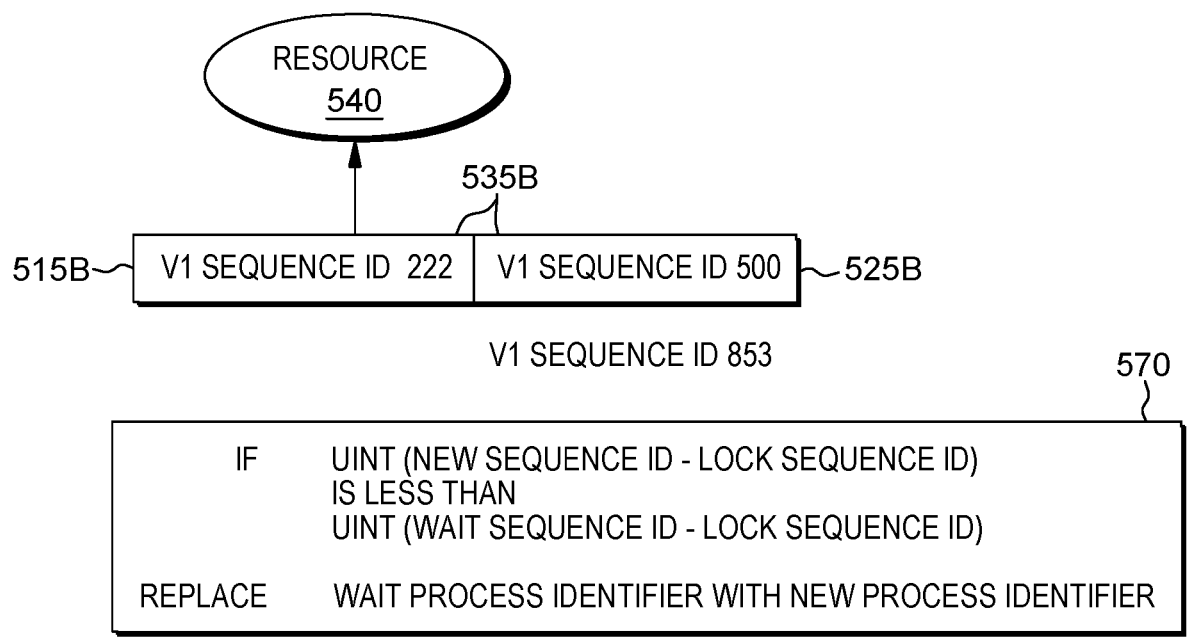
FIG. 5B is an example of multiple processes using the SMMutex with the lock management program after a new process has monitored SMMutex with the lock management program, in accordance with at least one embodiment of the invention.

FIG. 5B is an example of multiple processes using SMMutex 535B with lock management program 120 after the new process with a process identifier consisting of a valid indicator (e.g., V1) and sequence ID 500 has monitored SMMutex 535B with lock management program 120 (not depicted), in accordance with at least one embodiment of the invention. FIG. 5B is another example of lock management program 120 operation at a later period of time than FIG. 5A. As depicted, FIG. 5B includes SMMutex 535B which includes lock position 515B loaded with the process identifier of the first process having sequence ID 222 (e.g., the first process is still holding the lock position), wait position 525B is loaded with the process identifier of the third process with sequence ID 500, and the second process with sequence ID 853 is now waiting to reacquire wait position 525B.

Algorithm 570, used by lock management program 120, is depicted in FIG. 5B. Algorithm 570 is used by lock management program 120 to determine if a new process requesting resource 540 has a higher priority than a process in the wait position. If, as determined by algorithm 570 in lock management program 120, the new process with the process identifier of V1 sequence ID 500 has a higher priority then a process currently holding wait position 525B, then lock management program 120 replaces the process at the wait position with the new process that has the higher priority. In other words, when the new process meets the conditions of algorithm 570 and has a higher priority, lock management program 120 removes the second process with process identifier consisting of V1 sequence ID 853 from wait position 525B and replaces it with process identifier V1 sequence ID 500 of the new process. As depicted in FIG. 5B, lock management program 120 puts the process identifier of the new process meeting the conditions of algorithm 570 (i.e., the new process has a higher priority than the second process) in wait position 525B.

More specifically, according to algorithm 570, lock management program 120 replaces the process identifier of the second process with sequence ID 853 holding wait position 525A when the unsigned integer (uint) of the resultant of the subtraction of the sequence ID of the process identifier in the lock position 515A (e.g., sequence ID 222) from the sequence ID of the process identifier of the new process (e.g., sequence ID 500) requesting resource 140 is less than the unsigned integer (uint) of the resultant of the subtraction of sequence ID of the process identifier in lock position 515A (e.g., sequence ID 222) from the sequence ID of the process identifier of the second process in the wait position (e.g., sequence ID 853 in FIG. 5A). Since the new process with sequence ID 500 (e.g., the new process requesting resource 540) in FIG. 5A meets the criteria of algorithm 570, in FIG. 5B, the process identifier of the new process with sequence ID 500 replaces the process identifier of the second process with sequence ID 853 in wait position 525B. The second process now waits for wait position 525B. As there is a finite number of valid process identifiers, the priority calculation also works with a wrapping case when the sequence ID of the process in the wait position has a lower value than the sequence ID of the process in the lock position. The use of unsigned integers in algorithm 570 allows lock management program 120 to provide a fair access using sequence IDs of the processes.

When using algorithm 570, lock management program 120 determines a priority of a process resulting in a lower number has a higher priority or when the resultant of uint ((new process sequence ID)—lock process sequence ID)) is lower or less than the resultant of uint ((new process sequence ID)—lock process sequence ID)). In other words, when the conditions of algorithm 570, are met, the process attempting to access resource 140 has a higher priority. In one embodiment, algorithm 570 resides within SMMutex 535A and 535B in order to determine a fair access to wait position 525A and 525A and not in lock management program 120. In FIGS. 5A and 5B, SMMutex 535A and 535B provide a same function as SMMutex 135 and each of SMMutex 535A and 535B depict the self-managed mutual exclusion object at different periods of time (i.e., SMMutex 535A is depicted an earlier time than SMMutex 535B).

Figure 6:
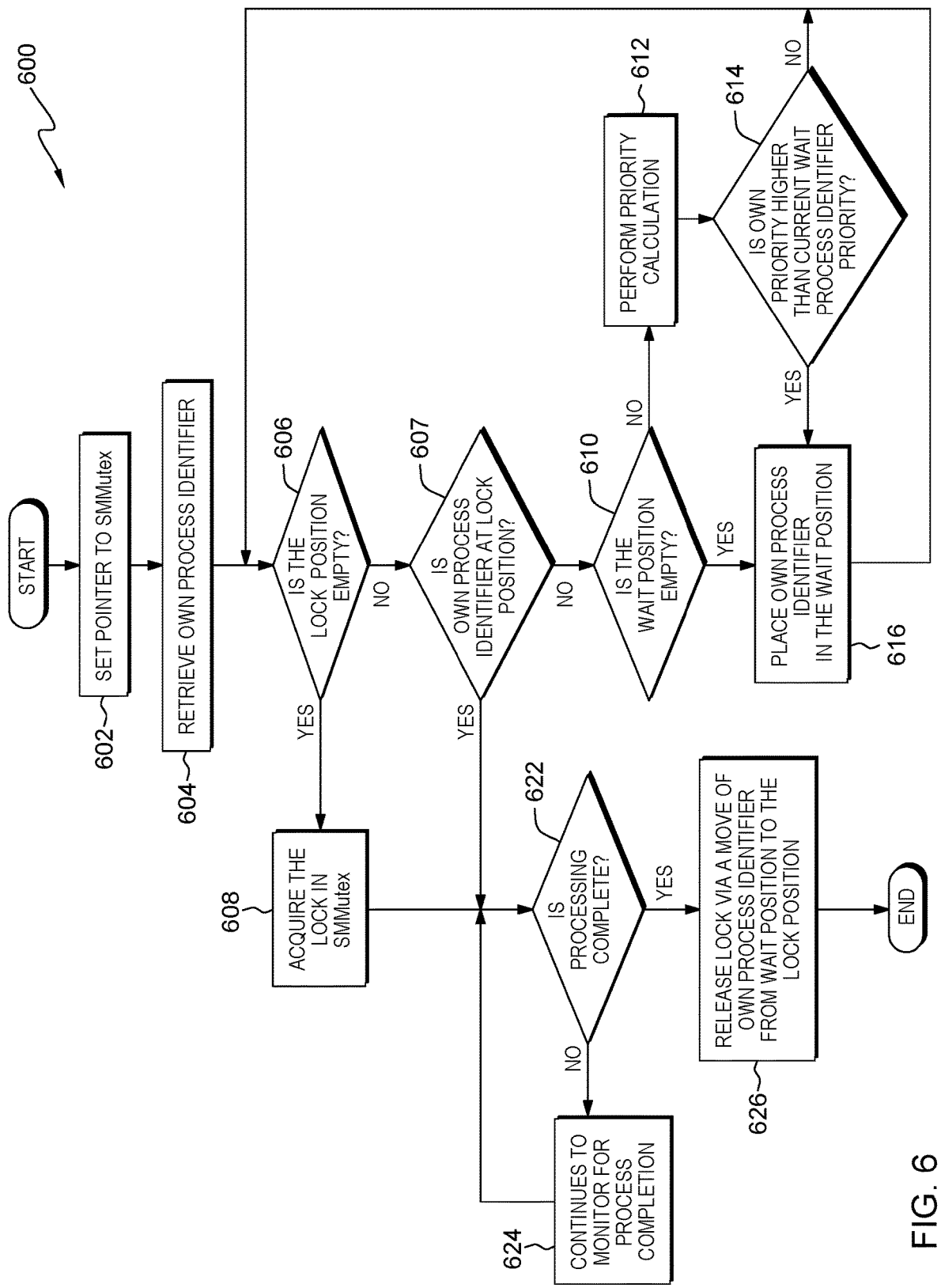
FIG. 6 is a flow chart diagram depicting operational steps for the lock management program, in accordance with at least one embodiment of the invention.

FIG. 6 is a flow chart 600 depicting operational steps of lock management program 120, in accordance with at least one embodiment of the invention. As depicted, FIG. 6 includes a plurality of steps executing in lock management program 120 in a computing system 160 using SMMutex 135, where SMMutex 135 includes with a lock position that may be occupied by a process with a process identifier (e.g., LockID) that includes a valid identifier and a sequence ID (e.g., LockSequence ID) and a wait position that may be occupied by a process with a process identifier called WaitID that includes a valid identifier and a sequence ID (e.g., WaitSequence ID). The operational steps of lock management program 120 can provide an equitable method of providing exclusive access of a single process of each of a plurality of processes requiring access to a shared resource in a sequential manner, determined according to an algorithm, such as algorithm 570 previously discussed with reference to FIG. 5B, that is included in lock management program 120. Alternatively, in one embodiment, algorithm 570 is included in SMMutex 135. An instance of lock management program 120 resides on each process in computer system 160 requiring accessing resource 140.

Lock management program 120 sets pointer to SMMutex 135 (step 602). When a process is ready or at a point where the shared resource, such as resource 140, is needed, lock management program 120 accesses or begins monitoring SMMutex 135, which controls the lock for exclusive access to resource 140.

Lock management program 120 retrieves own process identifier (step 604). Lock management program 120 retrieves the process identifier for the process on which lock management program 120 resides from memory 130 or other storage location. As previously discussed, the process identifier for each process in computer system 160 that requires access to resource 140 is unique with computer system 160. The retrieved process identifier of the process currently using lock management program 120 for the retrieval can be known as OwnID for purposes of discussion with respect to FIG. 6, and uniquely identifies the process associated with, executing, or including a copy or instance of lock management program 120 for the retrieval of OwnID.

Lock management program 120 determines whether the lock position is empty (decision step 606). Lock management program 120 queries SMMutex 135 to determine whether the lock position is empty. For example, lock management program 120 can query SMMutex 135 by requesting if SMMutex.LockID.V=0 to determine if the lock position is empty, where LockID is the process identifier of a process in the lock position of SMMutex 135 and V is the valid indicator portion of the process identifier as discussed previously with respect to FIG. 2.

Responsive to determining that the lock position is not empty (no branch of decision step 606), lock management program 120 determines whether its own process identifier (e.g., OwnID) has been placed into the lock position (decision step 607). In order to prevent a potential deadlock, lock management program 120 checks to see if another process's lock management program 120 has pulled or moved the process (e.g., has moved OwnID of the process) into the lock position of SMMutex 135.

Responsive to determining that the own process identifier (e.g., OwnID) has been placed into the lock position (yes branch of decision step 607), lock management program 120 acquires the lock and the process begins using resource 140. Lock management program 120 determines whether processing is complete (decision step 622). After acquiring the lock and beginning execution of resource 140, lock management program 120 may query either the process or resource 140 in order determine a status or a completion of execution of resource 140 by the process (e.g., the process on which lock management program 120 resides).

Responsive to determining that the own process identifier (e.g., OwnID) of the process has not been placed into the lock position (no branch of decision step 607), lock management program 120 determines whether the wait position is empty (decision step 610). Lock management program 120 may query SMMutex 135, for example by using SMMutex.WaitID.V=0, to determine if the wait position in SMMutex is occupied by another process (e.g., loaded with another process's process identifier).

Responsive to determining that the wait position is empty (yes branch of decision step 610), lock management program 120 places its own process identifier in the wait position of SMMutex 135 (step 616). When lock management program 120 places its own process identifier (e.g., OwnID) of the process on which lock management program 120 resides in the empty wait position, the process will be the next process to acquire the lock in SMMutex 135 (i.e., when OwnID is in the wait position).

Responsive to determining that the wait position is not empty (no branch of decision step 610), lock management program 120 performs a priority calculation (step 612). Using an algorithm, such as algorithm 570 from FIG. 5B, in lock management program 120, lock management program 120 can determine a priority of the process by using uint (OwnSequence ID—LockSequence ID), where uint is an unsigned integer and OwnSequence ID is the sequence ID portion of OwnID (e.g., the retrieved process identifier of step 602 of the process) and LockSequence ID is the sequence ID portion of LockID (e.g., the process identifier of the process holding the lock in SMMutex 135) as previously discussed in detail with respect to FIG. 5B.

In one embodiment, SMMutex 135 with algorithm 570 determines the process (e.g., with OwnID) has a higher priority and provides the process access to the wait position (e.g., replaces current WaitID at the wait position with OwnID of the process with a higher priority). In this embodiment, SMMutex 135 performs step 612 followed by decision step 614 and step 616. For example, SMMutex 135 can determine a priority of a process in this embodiment and can determine if that priority is higher than a process currently holding the wait position in order to replace the process in the wait position when the current process in the wait position has a lower priority.

Lock management program 120 determines whether the priority of OwnID is higher than the current wait process priority identifier (decision step 614). In various embodiments, lock management program 120 determines a higher priority is a lower numerical result of the priority calculation that is performed using algorithm 570, depicted in FIG. 5B. Lock management program 120 can determine uint(WaitSequence ID—LockSequence ID) as the priority of the current wait process, where WaitSequence ID is the sequence ID of WaitID (e.g., the process identifier of the process currently in the wait position of SMMutex 135). In various embodiments, lock management program 120 determines whether uint(OwnSequence ID—LockSequence ID) is less than uint(WaitSequence ID—LockSequence ID). As previously discussed with respect to FIG. 5B, when the resultant of one of uint(OwnSequence ID—LockSequence ID) or uint(WaitSequence ID—LockSequence ID) is smaller, the process (e.g., either the process with OwnID or the process in the wait position with WaitID) with the smaller number is the higher priority process. For example, lock management program 120 determines if the process identifier (e.g., OwnID from step 602) for the process monitoring SMMutex 135 has a higher priority than a process currently in the wait position of SMMutex 135. In one embodiment, SMMutex 135 includes algorithm 570 rather than lock management program 120, and SMMutex 135 performs the priority calculation to determine whether the priority of OwnID is higher the priority of the current process in the wait position of SMMutex 135.

Responsive to determining that own process identifier's priority is higher than the current wait process priority (yes branch of decision step 614), lock management program 120 places OwnID the process identifier of the process on which lock management program resides, in the wait position (step 616). When the conditions of algorithm 570 are met and uint(OwnSequence ID—LockSequence ID) is less than uint (WaitSequence ID—LockSequence ID), lock management program 120 replaces the process identifier of the process in the wait position (e.g., replaces a current WaitID) with the process identifier of the process monitoring SMMutex 135 (e.g., OwnID). For example, when the priority of the process (e.g., OwnID) is higher than the priority of the process currently holding the wait position (e.g., WaitID), lock management program 120 replaces the WaitID at the wait position with OwnID.

Responsive to determining that the priority of the process is not higher than the current wait process priority (no branch of decision step 614), lock management program 120 returns decision step 606 to determine whether the lock position is empty (decision step 606). In this case, lock management program 120 uses the method discussed in detail above to determine when the lock position is empty. In some embodiments, lock management program 120 includes a delay before attempting to query if the lock is empty. For example, in some cases, in order to avoid an excessive or high amount of memory accesses, a delay in executing decision step 606 again may be included in lock management program 120. In this example, the delay value could vary depending on the type of resource required as resource 140.

Responsive to determining that the lock position is empty (yes branch of decision step 606), lock management program 120 acquires the lock in SMMutex 135 (step 608). Lock management program 120 upon determining that the lock position is empty, places the process identifier (e.g., OwnID) of the process running lock management program 120 in the lock position (e.g., LockID becomes OwnID) and the process acquires the lock in SMMutex 135 providing access to execute resource 140.

Lock management program 120 determines whether processing is complete (decision step 622). Lock management program 120 determines whether the process (e.g., the process with OwnID in the lock position) has completed execution of resource 140. For example, lock management program 120 monitors the progress of OwnID executing resource 140. For example, lock management program 120 may query the process (e.g., with OwnID as process identifier) or may query resource 140 to receive a status on execution of resource 140.

Responsive to determining that processing is not complete (no branch of decision step 622), lock management program 120 continues to monitor for process completion (step 624). Lock management program 120 returns to decision step 622 to determine when the process has completed execution of resource 140. For example, lock management program 120 queries one of resource 140 or the process to determine if the process (e.g., OwnID process identifier in the lock position of SMMutex 135) has completed execution of resource 140.

Responsive to determining that process is complete (yes branch of decision step 622), lock management program 120 releases the lock via a move of own process identifier from the wait position to the lock position (step 626). Upon determining that the process with OwnID process identifier (e.g., the process running lock management program 120) that is in the lock position of SMMutex 135 has completed execution of the required computer programming code or functions of resource 140, lock management program 120 performs step 626. In various embodiments, lock management program 120 releases SMMutex 135 atomically by moving a process identifier of the process in the wait position to the lock position as lock management program 120 releases the lock that was held by OwnID process and the program ends. The wait position of SMMutex 135 becomes empty with this move operation.

If, at some later time, the process with lock management program 120 requires access to resource 140 (e.g., requires a second access to resource 140) or requires additional accesses to resource 140, then lock management program 120 returns to step 602 when access to resource 140 is required by the process and again executes the operational steps of FIG. 6.

FIG. 7 is table 700 representing an example of lock management program 120 providing exclusive access to a plurality of processes requiring access to resource 140 over a period of time, in accordance with at least one embodiment of the invention. As depicted, table 700 includes SMMutex 730 with a first column labeled lock position 715 that depicts a process identifier of the process currently holding lock position 715 as valid bit 716A and sequence ID 716B. Lines 1-7, each depict a different period of time and are in a sequential order. The second large column labeled wait position 725 depicts a process identifier of a process in wait position 725 as valid bit 725A and sequence ID 725B in each period of time indicated by each line of lines 1-7 in table 700. A third column 750 of table 700 depicts the process identifiers of processes monitoring SMMutex 730 at each period of time indicated by each line of table 700, where the process identifiers include valid bit 751A and sequence ID 751B. Each of lines 1-7 represent a different or a later time period, respectively.

In line 1 of table 700, the process with the process identifier with sequence ID 3 controls lock position 715 and valid bit 1 occupies lock position 715 in SMMutex 730. As depicted in the first line of table 700, the process with the process identifier with sequence ID 27 and valid bit 1 holds wait position 725, and no other processes are currently requiring access to resource 140 and therefore, no processes are monitoring SMMutex 730 (e.g., line 1 of column 750 is empty).

At a next period of time indicated by line 2 of table 700, the process with the process identifier with sequence ID 3 continues processing and maintains control of the lock, the process with sequence ID 27 remains in wait position 725 while the process with the process identifier with sequence ID 9 and valid bit 1 now requires resource 140 (not depicted) and is shown in line 2 of process identifiers of processes monitoring SMMutex in column 750. Using algorithm 570 (from FIG. 5B), lock management program 120 (not depicted) determines that the process with sequence ID 9 has a higher priority than the process with process identifier with sequence ID 27 in wait position 725 in line 2 and lock management program 120 replaces sequence ID 27 with sequence ID 9 in wait position 725 in line 3 of table 700. Also, in line 3 of table 700, the process with the process identifier with sequence ID 27 moves back to column 750 and is now monitoring SMMutex 730.

In line 4 of table 700, the process with the process identifier with the sequence ID 3 has completed execution of resource 140 and lock management program 120 atomically, released the lock and moved the process with the process identifier with sequence ID 9 into lock position 715 of SMMutex 730 and the process with the process identifier with the sequence ID 27 into wait position 725 in line 5 of table 700. No other processes are monitoring SMMutex 730 and column 750 is empty (i.e., valid bit 751A=0 and sequence ID 751B=0) in line 5.

In line 6, the process with the process identifier with the sequence ID 9 has completed execution of resource 140 and lock management program 120 releases the lock and moves the process in wait position 725 with the process identifier with sequence ID 27 into lock position 715. In line 6, process with the process identifier with sequence ID 27 has control of the lock and is executing the resource, such as resource 140 in FIG. 1 (not depicted in FIG. 7). Column 750 remains empty in line 6 and in line 7. When the process with the process identifier with sequence ID 27 completes execution of resource 140 and lock management program 120 releases the lock in line 7, each of lock position 715, wait position 725, and column 750 remain empty until another process requests access to resource 140.

While only one process was depicted in column 750 for process identifiers of processes monitoring SMMutex 730, column 750 unlike lock position 715 and wait position 725 is not limited to only one process identifier but may contain a plurality of process identifiers of the processes monitoring SMMutex 730 that are waiting require access to resource 140 (e.g., are waiting to acquire wait position 725 and ultimately, lock position 715 in order to execute resource 140).

FIG. 8 is a block diagram depicting components of a computer system 800 suitable for lock management program 120, in accordance with at least one embodiment of the invention. FIG. 8 displays the computer system 800, one or more processor(s) 804 (including one or more computer processors or central processor units), a communications fabric 802, a memory 806 including, a RAM 816, and a cache 818, a persistent storage 808, a communications unit 812, I/O interfaces 814, a display 822, and external devices 820. It should be appreciated that FIG. 8 provides only an illustration of one embodiment and does not imply any limitations with regard to the environments in which different embodiments may be implemented. Many modifications to the depicted environment may be made.

As depicted, the computer system 800 operates over the communications fabric 802, which provides communications between the computer processor(s) 804, memory 806, persistent storage 808, communications unit 812, and input/output (I/O) interface(s) 814. The communications fabric 802 may be implemented with an architecture suitable for passing data or control information between the processors 804 (e.g., microprocessors, communications processors, and network processors), the memory 806, the external devices 820, and any other hardware components within a system. For example, the communications fabric 802 may be implemented with one or more buses.

The memory 806 and persistent storage 808 are computer readable storage media. In the depicted embodiment, the memory 806 comprises a random-access memory (RAM) 816 and a cache 818. In general, the memory 806 may comprise any suitable volatile or non-volatile one or more computer readable storage media.

Program instructions for lock management program 120 may be stored in the persistent storage 808, or more generally, any computer readable storage media, for execution by one or more of the respective computer processors 804 via one or more memories of the memory 806. In an embodiment, program instructions for lock management program 120 may be stored in memory 806. The persistent storage 808 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of the persistent storage 808.

The communications unit 812, in these examples, provides for communications with other data processing systems or devices. In these examples, the communications unit 812 may comprise one or more network interface cards. The communications unit 812 may provide communications through the use of either or both physical and wireless communications links. In the context of some embodiments of the present invention, the source of the various input data may be physically remote to the computer system 800 such that the input data may be received, and the output similarly transmitted via the communications unit 812.

The I/O interface(s) 814 allow for input and output of data with other devices that may operate in conjunction with the computer system 800. For example, the I/O interface 814 may provide a connection to the external devices 820, which may be as a keyboard, keypad, a touch screen, or other suitable input devices. External devices 820 may also include portable computer readable storage media, for example thumb drives, portable optical or magnetic disks, and memory cards. Software and data used to practice embodiments of the present invention may be stored on such portable computer readable storage media and may be loaded onto the persistent storage 808 via the I/O interface(s) 814. The I/O interface(s) 814 may similarly connect to a display 822. The display 822 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for providing exclusive access to a resource shared by a plurality of processes in a computer system, the computer-implemented method comprising the steps of:
retrieving, by one or more computer processors, a process identifier for a first process attempting to access the resource, wherein the process identifier is uniquely assigned to each process of the plurality of processes requiring the resource in the computer system;
using, by one or more computer processors, a mutual exclusion object to provide exclusive access to the resource, wherein the mutual exclusion object includes a lock position allowing exclusive access to the resource and a wait position for a next process to attain the lock position;
determining, by one or more computer processors, whether the lock position in the mutual exclusion object is occupied by a process identifier of a second process, wherein the second process is executing the resource;
determining, by one or more computer processors, whether a process identifier for a third process is in the wait position in the mutual exclusion object;
responsive to determining that the process identifier for the third process is in the wait position in the mutual exclusion object and the second process is executing the resource, determining, by one or more computer processors, whether the first process attempting to access the resource has a higher priority than the third process in the wait position using an first unsigned integer resulting from a first subtraction of a first sequence identifier of the first process from a second sequence identifier of the second process and a second unsigned integer resulting from a second subtraction of a third sequence identifier of the third process from a second sequence identifier of the second process.

2. The computer-implemented method of claim 1, further comprising:
responsive to determining that the process identifier for the third process is not in the wait position in the mutual exclusion object, moving, by one or more processors, the process identifier of the first process into the wait position of the mutual exclusion object.

3. The computer-implemented method of claim 1, further comprising:
determining, by one or more computer processors, that the process identifier the process identifier of the first process attempting to access the resource has the higher priority than the process identifier of the third process in the wait position when the unsigned integer resulting from the first subtraction of the first sequence identifier from the second sequence identifier of the second process is less than the unsigned integer resulting from the second subtraction of the third sequence identifier of the third process from the second sequence identifier of the second process; and
replacing, by one or more computer processors, the third process in the wait position in the mutual exclusion object with the process identifier of the first process attempting to access the resource.

4. The computer-implemented method of claim 3, wherein determining whether the first process attempting to access the resource has the higher priority than the process identifier of the process identifier of the third process includes utilizing at least the process identifier for the first process attempting to access the resource, the process identifier for the second process in the lock position of the mutual exclusion object executing the resource, and the process identifier for the third process in the wait position of the mutual exclusion object.

5. The computer-implemented method of claim 3, wherein responsive to determining the process identifier of the third process in the wait position in the mutual exclusion object does not have the higher priority than the process identifier of the first process attempting to access the resource; and
removing, by one or more processors, the process identifier of the third process in the wait position of the mutual exclusion object.

6. The computer-implemented method of claim 5, further comprises:
releasing, by one or more computer processors, the wait position of the mutual exclusion object when by the first process leaves to execute another function;
determining, by one or more computer processors, that the process identifier of the first process still has the higher priority than the third process in the wait position of the mutual exclusion object, wherein the second process is still executing the resource after the first process returns to re-attempt to access the resource; and
replacing, by one or more processors, the process identifier of the third process in the wait position of the mutual exclusion object with the process identifier of the first process re-attempting to access the resource.

7. The computer-implemented method of claim 3, further comprises:
acquiring, by one or more computer processors, by the first process, the lock position in the mutual exclusion object when the second process completes execution of the resource and moves the process identifier of the first process into the lock position of the mutual exclusion object;
executing, by one or more computer processors, the resource by the first process in the lock position of the mutual exclusion object;
moving, by one or more computer processors, the third process into the wait position of the mutual exclusion object;
completing, by one or more computer processors, execution of the resource by the first process in the lock position of the mutual exclusion object; and
releasing, by one or more computer processors, by the first process, the lock position of the mutual exclusion object; and
moving, by one or more computer processors, the process identifier of the third process in the wait position of the mutual exclusion object into the lock position of the mutual exclusion object, wherein the releasing the lock position and the moving the process identifier of the third process into the lock position of the mutual exclusion object occurs atomically.

8. A computer program product for providing exclusive access to a resource shared by a plurality of processes in a computer system, the computer program product comprising:
one or more computer readable storage media; and
program instructions stored on the one or more computer readable storage media, the program instructions comprising:
program instructions to retrieve a process identifier for a first process attempting to access the resource, wherein the process identifier is uniquely assigned to each process of the plurality of processes requiring access to the resource in the computer system;

program instructions to use, at least, the process identifier and a mutual exclusion object to provide exclusive access to the resource, wherein the mutual exclusion object includes a lock position providing exclusive access to the resource and a wait position for a next process to attain the lock position;

program instructions to determine whether the lock position in the mutual exclusion object is occupied by a process identifier of a second process, wherein the second process is executing the resource;

program instructions to determine whether a process identifier for a third process is in the wait position in the mutual exclusion object;

responsive to determining that process identifier for the third process is in the wait position in the mutual exclusion object and the second process is executing, program instructions to determine whether the process identifier for the third process in the wait position in the mutual exclusion object has a higher priority than the process identifier of the first process attempting to access the resource using an first unsigned integer resulting from a first subtraction of a first sequence identifier of the first process from a second sequence identifier of the second process and a second unsigned integer resulting from a second subtraction of a third sequence identifier of the third process from a second sequence identifier of the second process.

9. The computer program product of claim 8, further comprising:

responsive to determining that the process identifier for the third process is not in the wait position in the mutual exclusion object, program instructions to move the process identifier of the first process into the wait position of the mutual exclusion object.

10. The computer program product of claim 8, further comprising:

responsive to determining that the process identifier of the first process attempting to access the resource has the higher priority than the process identifier for the third process is in the wait position in the mutual exclusion object when the unsigned integer resulting from the first subtraction of the first sequence identifier from the second sequence identifier of the second process is less than the unsigned integer resulting from the second subtraction of the third sequence identifier of the third process from the second sequence identifier of the second process; and program instruction to replace the third process in the wait position in the mutual exclusion object with the process identifier of the first process attempting to access the resource.

11. The computer program product of claim 10, wherein determining whether the first process attempting to access the resource has the higher priority than the process identifier of the process identifier of the third process includes utilizing at least the process identifier for the first process attempting to access the resource, the process identifier for the second process in the lock position of the mutual exclusion object executing the resource, and the process identifier for the third process in the wait position of the mutual exclusion object.

12. The computer program product of claim 8, wherein responsive to determining the process identifier of the third process in the wait position in the mutual exclusion object does not have the higher priority than the process identifier of the first process attempting to access the resource; and replacing, by one or more processors, the process identifier of the third process in the wait position of the mutual exclusion object with the process identifier of the first process attempting to access the resource.

13. A computer system for providing exclusive access to a resource shared by a plurality of processes in a computer system, the computer system comprising:

one or more computer processors;

one or more computer readable storage media; and program instructions, stored on the one or more computer readable storage media for execution by at least one of the one or more computer processors, the program instructions comprising:

program instructions to retrieve a process identifier for a first process attempting to access the resource, wherein the process identifier is uniquely assigned to each process of the plurality of processes in the computer system;

program instructions to use, at least, the process identifier for the first process and a mutual exclusion object to provide exclusive access to the resource, wherein the mutual exclusion object includes a lock position providing exclusive access to the resource and a wait position for a next process to attain the lock position;

program instructions to determine whether the lock position in the mutual exclusion object is occupied by a process identifier of a second process, wherein the second process is executing the resource;

program instructions to determine whether a process identifier for a third process is in the wait position in the mutual exclusion object;

responsive to determining that process identifier for the third process is in the wait position in the mutual exclusion object and the second process is executing, program instructions to determine whether the process identifier for the third process in the wait position in the mutual exclusion object has a higher priority than the process identifier of the first process attempting to access the resource using an first unsigned integer resulting from a first subtraction of a first sequence identifier of the first process from a second sequence identifier of the second process and a second unsigned integer resulting from a second subtraction of a third sequence identifier of the third process from a second sequence identifier of the second process.

14. A computer system of claim 13, wherein to use, at least, the process identifier for the first process and a mutual exclusion object to provide exclusive access to the resource comprises:

program instructions to determine whether the lock position in the mutual exclusion object is occupied by a process identifier of a second process, wherein the second process is executing the resource;

responsive to determining that the lock position is occupied by the process identifier of the second process; program instructions to determine whether a process identifier for a third process is stored in the wait position in the mutual exclusion object; and responsive to determining that the process identifier of the third process is not stored in the wait position in the mutual exclusion object, program instructions to move the process identifier of the first process into the wait position of the mutual exclusion object.

15. A computer system of claim 14, further comprising:
program instructions to determine whether a process identifier of a fourth process attempting to access the resource has a higher priority than the process identifier of the first process stored in the wait position includes using an algorithm to determine that the process identifier of the fourth process attempting to access the resource has a higher priority than the process identifier of the first process; and
program instructions to replace the process identifier of the first process in the wait position with the process identifier of the fourth process attempting to access the resource.

16. A computer system of claim 14, further comprising:
program instructions to determine that the process identifier of the first process in the wait position in the mutual exclusion object temporarily stops attempting to access the resource when the process identifier of the first process leaves the wait position of the mutual exclusion object;
program instructions to determine that the first process is again requesting access to the resource;
program instructions to determine whether the wait position is occupied by a process identifier of a fifth process;
responsive to determining that the wait position is occupied by the process identifier of the fifth process, program instructions to determine whether the process identifier of the first process has the higher priority than a process identifier of a fifth process in the wait position of the mutual exclusion object; and
responsive to determining that the process identifier of the first process has the higher priority than a process identifier of a fifth process in the wait position of the mutual exclusion object, program instructions to replace the process identifier of the fifth process in the wait position of the mutual exclusion object with the process identifier of the first process again requesting access to the resource.

17. A computer system of claim 13, wherein the program instructions to determine whether the process identifier for the third process in the wait position in the mutual exclusion object has a higher priority than the process identifier of the first process attempting to access the resource further comprises:
program instructions to determine that the unsigned integer of the resultant of the first subtraction is less than the unsigned integer of the resultant of the second subtraction in order to determine that the process identifier of the first process attempting to access the resource has the higher priority than the process identifier of the third process in the wait position, and
program instruction to replace the third process in the wait position in the mutual exclusion object with the process identifier of the first process attempting to access the resource.

* * * * *